United States Patent Office 3,254,127
Patented May 31, 1966

3,254,127
PROCESS FOR THE MANUFACTURE OF CYCLODEC-5-EN-1-ONE
Albert Schnider, Domat, Ems, Werner Hurschler, Chur, Graubunden, and Peter Hofferberg, Graubunden, Switzerland; said Schnider assignor to Inventa A.G. fuer Forschung und Patentverwertung, Zurich, Switzerland
No Drawing. Filed June 12, 1962, Ser. No. 201,807
Claims priority, application Switzerland, June 20, 1961, Apr. 25, 1962, 7,127/61
6 Claims. (Cl. 260—586)

The invention relates to a process for the production of cyclodec-5-en-1-one and, more particularly, to such a process commercially feasible and with the aid of dehydrating catalysts whose dehydrating action hitherto had not been known.

ω-Caprilactam, the lactam of capric acid, also known as decanoic acid, can be polymerized to the so-called "Polyamide 10." Caprilactam is produced by a method known per se (A. Müller and R. Pflüger, Kunststoffe 50, 1960, 205) from trans-9-decalylperoxide, which in turn had been obtained by the oxidation of Decalin. An intermediate product in that lactam synthesis is cyclodecan-6-ol-1-one, which must be converted into cyclodecanone. The latter then is oximized and is subjected to a Beckmann rearrangement thus obtaining ω-caprilactam. A production-size large-scale process for the conversion of cyclodecan-6-ol-1-one into cyclodecanone has not been known to date. R. C. Cope and G. Molzmann, JACS 72, 1950, 3062–3068, produce cyclodecan-1-ol-6-one with p-toluenesulfochloride in pyridine by way of the corresponding p-toluenesulfonate, wherefrom cyclodec-5-en-1-one is obtained by treatment with 7 times the amount diethylaniline at 160–170° C. beside approximately 10 percent cyclopentanocycloheptanone. The cyclodec-5-en-1-one thus produced readily is hydrogenated at cyclodecanone. The reagents used in this synthesis, especially p-toluenesulfochloride and pyridine, as well as the large excess of diethylaniline which must be neutralized, just as the pyridine, for the purpose of separation from the reaction product, cannot be employed industrially because of the expenses involved thus rendering the process economically unfeasible. Moreover, the p-toluenesulfonic acid ester of cyclodecanone is rather unstable so that it is hardly possible to carry out the process safely on a large production scale.

Müller and Pflüger (l.c.) mention in passing that cyclodecanone may be produced by splitting water of cyclodecane-1-ol-6-one, thereby obtaining cyclodec-5-en-1-one and hydrogenation of the latter. A process for this synthesis, especially for the method of splitting water off the oxyketone to form the desired cyclodecenone, however, has not been disclosed anywhere to date. This probably is due to the fact that the dehydrating catalysts commonly used are totally unsuited for the purpose at hand. Such catalysts are, e.g., aluminum oxide; zinc chloride; concentrated mineral acids, such as sulfuric, hydrochloric, phosphoric acids; acid anhydrides (e.g., phosphorus pentoxide); acid phosphates; and acid sulfates. The reasons for their unsuitability are not known, however, it is a fact that with these catalysts cyclodec-5-en-1-one does not form or, at best, in insignificant quantities. In the latter instance, they are accompanied by a very large percentage of polymerization products and such by-products which cannot be reconverted into the starting material.

It now have been found unexpectedly and surprisingly that cyclodecan-1-ol-6-one can be dehydrated to cyclodec-5-en-1-one with the use of catalysts which heretofore had not been considered adaptable for dehydration, whereby the amount of by-products inconvertible to the starting material is practically negligible.

The process according to the invention for the production of cyclodec-5-en-1-one from cyclodecan-6-ol-1-one or from its monocarboxylic ester by dehydration or by splitting off acid, respectively, in the presence of catalysts has as its salient features the facts that cyclodecan-6-ol-1-one or its carboxylic acid ester is heated in the presence of heavy metals, e.g., platinum, zinc, iron, or their oxides, but especially in the presence of basic to stoichiometrically approximately neutral metal salts or metal salt mixtures. The cyclodec-5-en-1-one thus formed primarily then is separated from the reaction mixture by fractionation, and the 1,6-oxidocyclodecene-1, obtained as by-product, is hydrated to oxyketone by means of aqueous acid and is recycled into the process. The metal salts employed preferably are produced by neutralization at optimum molar proportions, i.e., for instance from the oxides or hydroxides by addition of definite amounts of suitable acids (basic iron acetate—3 mols $Fe_2O_3$:1.2 mols $CH_3COOH$; basic zinc phosphate—1.75 mols $ZnO$:1 mol $H_3PO_4$, etc.).

As becomes evident from the examples for a batchwise manufacture, the conversion rates and the yields of cyclodec-5-en-1-one are comparatively low in some instances. This, however, is of no importance in a large-scale production, when carried out continuously, because the principal by-product obtained is 1,6-oxidocyclodecene-1 which is recycled, in the form of the oxyketone, into the process or else is converted, with the aid of a platinum catalyst, into cyclodec-5-en-1-one, as presented in Examples 1 and 4 below.

The invention now will be more fully explained by the following examples. However, it should be understood that these are given merely by way of illustration, not of limitation, and that numerous changes may be made in the details without departing from the spirit and the scope of the invention as hereinafter claimed.

*Example 1*

30 g. cyclodecan-6-ol-1-one were heated, together with 10 g. platinum wire net, for 15 minutes to 250–275° C. in a $V_4A$-type stainless steel rotating autoclave of 100 ml. capacity. After cooling, the reaction product was subjected to a vacuum distillation. 13 ml. distillate having a boiling point of 94–150° C. were obtained at 12 mm. Hg. In the still, approximately 15 g. unchanged oxyketone remained.

The 13 ml. distillate were fractionated in an efficient column, whereby 1.3 g. cyclodec-5-en-1-one were obtained, and the following by-products:

10.6 g. 1,6-oxidocyclodecene-1; (11-oxa-bicyclo-(1:4:4)-undecene-1)
0.3 g. cyclopentanocycloheptanone (4 - keto - bicyclo-(0:3:5)-decane)
0.8 g. oxyketone The cyclodec-5-en-1-one obtained had a boiling point of 100–103° C. at 12 mm. Hg (literature: 81.5–84° C. at 4.4–5 mm. Hg). The yield, calculated on the reacted starting product, was approximately 10 percent.

The oxidocyclodecene can either be reconverted into oxyketone by a treatment with acid and then can be recycled into the process, or else, it can be reacted to cyclodec-5-en-1-one, as described in Example 4 below.

*Example 2*

30 cyclodecan-6-ol-1-one (M.P. 73° C.) were subjected with approximately 70 g. sheet iron coils which had been zinc-clad under fire, to a pyrolysis for 15 minutes at 230–240° C. in a $V_4A$-type stainless steel rotating autoclave of 100 ml. capacity. The final pressure at 240° C. was approximately 15 atmospheres. From the reaction products, 12 ml. of a product were obtained by distillation at temperatures from 93 to 150° C. at 12 mm. Hg. The residue in the distilling flask consisted to 90 percent of unchanged oxyketone.

The distillate was fractionated, and the following products resulted:

|   | G. |
|---|---|
| Cyclodec-5-en-1-one | 1.2 |
| Hydrocarbons (first run) | 0.25 |
| 1,6-oxidocyclodecene-1 | 9.1 |
| Cyclopentanocycloheptanone | 0.2 |
| Oxyketone | 1.25 |

The cyclodec-5-en-1-one had a boiling point of 101–102.5° C. at 12 mm. Hg (literature: 81.5–84° C. at 4.4–5 mm. Hg). The yield, calculated on the reacted starting product, was approximately 11 percent.

Through hydration of the oxidocyclodecene, obtained as by-product, in aqueous acetic acid, cyclodecan-1-ol-6-one was recovered which again was reacted.

Example 3

30 g. cyclodecan-6-ol-1-one were dehydrated, in the presence of 70 g. zinc-clad sheet iron coils, in a glass vessel in a cycle first with 5 ml. xylene and subsequently with the oxidocyclodecene formed, at 240–260° C.

The quantity of water entrained by the xylene and by the oxidocyclodecene, respectively, was approximately 1.8 g. at a conversion of 15 g. oxyketone. The volatile constituents were removed from the reaction mixture by distillation at 12 mm. Hg. The residue consisted mainly of oxyketone. The boiling point of the distillate at 12 mm. Hg was 80–150° C.

By the fractionation of the distillate, the following products were obtained:

|   | G. |
|---|---|
| Cyclodec-5-en-1-one | 1.1 |
| Hydrocarbons | 0.5 |
| 1,6-oxidocyclodecene-1 | 12.0 |
| Cyclopentanocycloheptanone | 0.4 |
| Oxyketone | 1.0 |

The cyclodec-5-en-1-one obtained had a boiling point at 12 mm. Hg of 100–102.5° C. (literature: 81.5–84° C. at 4.4–5 mm. Hg). The yield, calculated on reacted starting product, was 8–10 percent.

By the hydration in aqueous acetic acid of the oxidocyclodecene, obtained as by-product, cyclodecen-1-ol-6-one was recovered in good yield which again was entered in the reaction.

Example 4

30 g. 1,6-oxidocyclodecene-1 were heated with 3 ml. water, in the presence of 10 g. platinum wire net, at 250° C. for 15 minutes in a 100 ml. V$_4$A-type stainless steel rotating autoclave, and the reaction liquid obtained, after cooling, distilled as completely as possible. 29 ml. distillate were obtained having a boiling range of 92–130° C. at 12 mm. Hg. A fractionation of the distillate yielded, at a conversion of approximately 10 percent, the following products:

|   | G. |
|---|---|
| Cyclodec-5-en-1-one | 1.7 |
| Hydrocarbons (first run) | 0.4 |
| 1,6-oxidocyclodecene | 27.2 |
| Cyclopentanocycloheptanone | 0.4 |
| Oxyketone | 0.3 |

The cyclodec-5-en-1-one thus obtained had a boiling point at 12 mm. Hg of 100–103° C. The yield, calculated on reacted starting product was approximately 60 percent.

Example 5

30 g. cyclodecan-6-ol-1-one, pretreated with 7 g. ferric oxide and acetic acid (corresponding to a formula of 60 g. iron oxide plus 20 ml. glacial acetic acid plus 100 ml. water, refluxed for 12 hours and evaporated to dryness at 70° C.) were heated for 15 minutes at 250–280° C. in a 100 ml. V$_4$A-type stainless steel rotating autoclave. After filtration of the reaction mixture, fractionation of the distillate yielded:

|   | G. |
|---|---|
| Cyclodec-5-en-1-one | 4.3 |
| 1,6-oxidocyclodecene-1 | 19.1 |
| Cyclopentanocycloheptanone | 0.5 |
| Cyclic hydrocarbons | 0.1 |

The conversion was nearly 90 percent. The yield of cyclodec-5-en-1-one, calculated on the reacted starting material (27 g.) was 18 percent. The boiling point at 12 mm. Hg was 100.5–102° C.

Example 6

30 g. cyclodecan-6-ol-1-one were mixed with 7 g. weakly basic zinc phosphate. The latter had been prepared by boiling a dilute aqueous suspension of 1.75 mols zinc oxide with 1 mol phosphoric acid and subsequent evaporation to dryness. The mixture was reacted for 15 minutes at 250–260° C. in a 100 ml. V$_4$A-type stainless steel rotating autoclave whereby approximately 90 percent of the starting material were reacted. After filtration of the autoclave content, the filtrate was fractionated and yielded:

|   | G. |
|---|---|
| Cyclodec-5-en-1-one | 7.2 |
| 1,6-oxidocyclodecene-1 | 15.6 |
| Cyclopentanocycloheptanone | 0.7 |
| Cyclic hydrocarbons | 0.5 |

The cyclodec-5-en-1-one fraction had a boiling point at 12 mm. Hg of 100–103° C. The yield, calculated on the reacted oxyketone, was 30 percent.

Example 7

30 g. cyclodecan-6-ol-1-one were mixed with 7 g. basic iron phosphate. The latter had been prepared by prolonged boiling of an aqueous mixture of 3.6 mols ferric oxide and 1.1 mol phosphoric acid and evaporation to dryness.

The mixture of cyclodecan-6-ol-1-one and iron phosphate was in a distilling flask wherefrom it was distilled at atmospheric pressure on an oil bath at 95–210° C.

The distillate was freed from water and fractionated and yielded:

|   | G. |
|---|---|
| Cyclodec-5-en-1-one | 5.3 |
| 1,6-oxidocyclodecene-1 | 18 |
| Cyclopentanocycloheptanone | 0.5 |
| Cyclic hydrocarbons | 0.3 |

The cyclodec-5-en-1-one obtained had a boiling point at 12 mm. Hg of 101–102.5° C.

Example 8

20 g. cyclodecan-1-ol-6-one acetate were distilled in the presence of 10 g. platinum wire net from a distilling flask on a heating bath of 300° C. while conducting through it a weak stream of nitrogen. After removal of the main quantity of the acetic acid formed as first run, 10 g. of an oily distillate were collected while approximately 6 ml. unchanged ester remained in the flask. The oily distillate was deacidified with dilute soda solution, dissolved in a little chloroform and fractionated.

The following products were obtained:

|   | G. |
|---|---|
| Cyclodec-5-en-1-one | 7.1 |
| Low-boiling cyclic hydrocarbons | 0.8 |
| Cyclopentanocycloheptanone | 0.8 |
| Unchanged ester | 1.4 |

The cyclodec-5-en-1-one had a boiling point of 100.5–103° C. at 12 mm. Hg. The yield, calculated on reacted starting product, was approximately 82 percent.

Example 9

30 g. cyclodecan-1-ol-6-one, recrystallized from diisopropyl ether and having a melting point of 70° C. were heated for 10 minutes at 225° C. in a V₄A-type stainless steel autoclave of 100 ml. capacity with 7 g. calcium sulfate semi-hydrate (gypsum). After cooling and filtration of the calcium sulfate, the distillation of the reaction mixture yields, beside 13 g. unreacted starting material, 16 g. of a fraction having a boiling point of 100–150° C. at 12 mm. consisting, beside 10 percent oxyketone, practically solely of cyclodecenone and oxidocyclodecene. The yield of cyclodecenone was 20 percent, calculated on the reacted oxyketone.

Example 10

A flask of one-half liter capacity was half-filled with cyclodecan-1-ol-6-one, and heated to 173° C. while a stream of nitrogen was conducted through the liquid in such a manner that the distillation speed was 50 ml. oxyketone per hour. The vapors passed through a glass tube installed on top of the flask having a diameter of 20–25 mm. and a length of 400 mm. which was filled with anhydrous calcium sulfate pieces and was held at a temperature of 250° C. The condensate obtained had the following composition, as ascertained by gas-chromatographic analysis:

| | Percent |
|---|---|
| First run (bicyclic hydrocarbons) | 11.4 |
| 1,6-oxidocyclodecene-1 | 65.8 |
| Cyclodec-5-en-1-one | 22.7 |

Example 11

30 g. cyclodecan-1-ol-6-one, together with 7 g. zinc silicate, were entered in a 100 ml. V₄A-type stainless steel rotating autoclave, wherein the mixture was heated at 250° C. for 10 minutes. The zinc silicate had been prepared from sodium waterglass with an excess zinc chloride solution. The conversion was approximately 50 percent. The oxyketone-free distillate had the following composition:

| | Percent |
|---|---|
| 1,6-oxidocyclodecene-1 | 76 |
| Cyclodec-5-en-1-one | 22 |
| Cyclopentanocycloheptanone | 2 |

We claim as our invention:

1. A process for the manufacture of cyclodec-5-en-1-one, which comprises heating a compound selected from the group consisting of cyclodecane-6-ol-1-one and its acetic acid ester for approximately 15 to 30 minutes at substantially 230 to 275° C. in the presence of a catalyst, selected from the group consisting of platinum, zinc, iron oxides and basic to stoichiometrically approximately neutral iron and zinc acetates and phosphates, zinc silicate, calcium sulfate, and mixtures thereof, separating the cyclodec-6-en-1-one thus formed by fractionation, hydrating the 1,6-oxidocyclodecene-1, simultaneously obtained as by-product, with water in the presence of platinum as catalyst at substantially 250° C., to cyclodec-5-en-1-one, and combining the latter with the cyclodec-5-en-1-one previously obtained.

2. The process as defined in claim 1, wherein said heating is carried out at atmospheric pressure.

3. The process as defined in claim 1, wherein said heating is carried out in an autoclave under pressure.

4. The process as defined in claim 1, wherein said heating is carried out in the gas phase.

5. A process for the manufacture of cyclodec-5-en-1-one, which comprises pyrolytically splitting cyclodecan-6-ol-1-one acetate by distillation in the presence of platinum into cyclodec-5-en-1-one and acetic acid, neutralizing said acid, and recovering the cyclodec-5-en-1-one by fractionation.

6. A process for the manufacture of cyclodec-5-en-1-one, which comprises pyrolytically splitting cyclodecan-6-ol-1-one acetate, by distillation in the presence of platinum at a bath temperature of substantially 300° C. and while conducting a weak stream of nitrogen therethrough, into cyclodec-5-en-1-one and acetic acid, neutralizing said acid, and recovering said cyclodec-5-en-1-one by fractionation.

References Cited by the Examiner

UNITED STATES PATENTS

| 2,544,737 | 3/1951 | Theobald | 260—333 |
| 2,656,391 | 10/1953 | Stoll | 260—586 |
| 2,790,005 | 4/1957 | Blomquist et al. | 260—586 |

FOREIGN PATENTS 1,083,259   6/1960   Germany.

OTHER REFERENCES

Cope, J. Am. Chem. Soc., 84, 2411–14 (1962).
Griegee, Ber. der Deut. Chem. Gesell., 77, 722–726 (1944).

LEON ZITVER, *Primary Examiner.*